United States Patent
Wolf et al.

(10) Patent No.: US 11,678,249 B2
(45) Date of Patent: Jun. 13, 2023

(54) LOW BAND ASSISTED ROUTING FOR MULTI-HOP NETWORKS WITH HIGH BAND DATA TRAFFIC

(71) Applicant: QUALCOMM Incorporated, San Diego, CA (US)

(72) Inventors: Guy Wolf, Rosh Haayin (IL); Assaf Touboul, Netanya (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/191,354

(22) Filed: Mar. 3, 2021

(65) Prior Publication Data
US 2021/0306930 A1 Sep. 30, 2021

Related U.S. Application Data

(60) Provisional application No. 62/994,112, filed on Mar. 24, 2020.

(51) Int. Cl.
| | | |
|---|---|---|
| *H04W 40/22* | (2009.01) | |
| *H04L 5/00* | (2006.01) | |
| *H04W 40/32* | (2009.01) | |
| *H04W 40/24* | (2009.01) | |

(52) U.S. Cl.
CPC ........... *H04W 40/22* (2013.01); *H04L 5/0012* (2013.01); *H04W 40/248* (2013.01); *H04W 40/32* (2013.01)

(58) Field of Classification Search
CPC ... H04W 40/22; H04W 40/248; H04W 40/32; H04L 5/0012
See application file for complete search history.

(56) References Cited

U.S. PATENT DOCUMENTS

| | | | |
|---|---|---|---|
| 11,240,660 B2 * | 2/2022 | Hu | H04W 12/04 |
| 2015/0043384 A1 | 2/2015 | Hui et al. | |
| 2021/0298111 A1 * | 9/2021 | Pham Van | H04W 76/25 |
| 2022/0132372 A1 * | 4/2022 | Narasimha | H04W 88/085 |
| 2022/0182917 A1 * | 6/2022 | Muhammad | H04L 45/42 |
| 2022/0191934 A1 * | 6/2022 | Miao | H04W 74/002 |

FOREIGN PATENT DOCUMENTS

WO WO-2018064179 A1 4/2018

OTHER PUBLICATIONS

International Search Report and Written Opinion—PCT/US2021/070232—ISA/EPO—dated Jun. 22, 2021.

* cited by examiner

*Primary Examiner* — Shukri Taha
(74) *Attorney, Agent, or Firm* — Harrity & Harrity, LLP

(57) ABSTRACT

Various aspects of the present disclosure generally relate to wireless communication. In some aspects, a wireless node may receive, from a source node, an access request message using a first carrier, wherein the first carrier is to be used for routing decision traffic by each wireless node of a cluster of wireless nodes of the wireless multi-hop network, wherein the cluster includes the wireless node and the source node; and transmit, to the source node, an access response message using the first carrier, wherein the access response message indicates a selected routing option, of a set of routing options, for the source node to use to transmit a data communication to the wireless node using a second carrier. Numerous other aspects are provided.

30 Claims, 7 Drawing Sheets

LOW BAND ASSISTED ROUTING FOR MULTI-HOP NETWORKS WITH HIGH BAND DATA TRAFFIC

CROSS-REFERENCE TO RELATED APPLICATION

This Patent application claims priority to U.S. Provisional Patent Application No. 62/994,112, filed on Mar. 24, 2020, entitled "LOW BAND ASSISTED ROUTING FOR MULTI-HOP NETWORKS WITH HIGH BAND DATA TRAFFIC," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for low band assisted routing for multi-hop networks with high band traffic.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a wireless node, may include receiving, from a source node, an access request message using a first carrier, wherein the first carrier is to be used for routing decision traffic by each wireless node of a cluster of wireless nodes of the wireless multi-hop network, wherein the cluster includes the wireless node and the source node; and transmitting, to the source node, an access response message using the first carrier, wherein the access response message indicates a selected routing option, of a set of routing options, for the source node to use to transmit a data communication to the wireless node using a second carrier.

In some aspects, a method of wireless communication, performed by a wireless node, may include transmitting, to a destination node, an access request message using a first carrier, wherein the first carrier is to be used for routing decision traffic by each wireless node of a cluster of wireless nodes of the wireless multi-hop network, wherein the cluster includes the wireless node and the destination node; and receiving, from the destination node, an access response message using the first carrier, wherein the access response message indicates a selected routing option, of a set of routing options, for the wireless node to use to transmit a data communication to the destination node using a second carrier.

In some aspects, a wireless node for wireless communication may include a memory and one or more processors operatively coupled to the memory. The memory and the one or more processors may be configured to receive, from a source node, an access request message using a first carrier, wherein the first carrier is to be used for routing decision traffic by each wireless node of a cluster of wireless nodes of the wireless multi-hop network, wherein the cluster includes the wireless node and the source node; and transmit, to the source node, an access response message using the first carrier, wherein the access response message indicates a selected routing option, of a set of routing options, for the source node to use to transmit a data communication to the wireless node using a second carrier.

In some aspects, a wireless node for wireless communication may include a memory and one or more processors operatively coupled to the memory. The memory and the one or more processors may be configured to transmit, to a destination node, an access request message using a first carrier, wherein the first carrier is to be used for routing decision traffic by each wireless node of a cluster of wireless nodes of the wireless multi-hop network, wherein the cluster includes the wireless node and the destination node; and receive, from the destination node, an access response message using the first carrier, wherein the access response message indicates a selected routing option, of a set of routing options, for the wireless node to use to transmit a data communication to the destination node using a second carrier.

In some aspects, a non-transitory computer-readable medium may store one or more instructions for wireless communication. The one or more instructions, when executed by one or more processors of a wireless node, may cause the one or more processors to receive, from a source node, an access request message using a first carrier, wherein the first carrier is to be used for routing decision traffic by each wireless node of a cluster of wireless nodes of the wireless multi-hop network, wherein the cluster includes the wireless node and the source node; and transmit, to the source node, an access response message using the first carrier, wherein the access response message indicates a selected routing option, of a set of routing options, for the source node to use to transmit a data communication to the wireless node using a second carrier.

In some aspects, a non-transitory computer-readable medium may store one or more instructions for wireless communication. The one or more instructions, when executed by one or more processors of a wireless node, may cause the one or more processors to transmit, to a destination node, an access request message using a first carrier, wherein the first carrier is to be used for routing decision traffic by each wireless node of a cluster of wireless nodes of the wireless multi-hop network, wherein the cluster includes the wireless node and the destination node; and receive, from the destination node, an access response message using the first carrier, wherein the access response message indicates a selected routing option, of a set of routing options, for the wireless node to use to transmit a data communication to the destination node using a second carrier.

In some aspects, an apparatus for wireless communication may include means for receiving, from a source node, an access request message using a first carrier, wherein the first carrier is to be used for routing decision traffic by each wireless node of a cluster of wireless nodes of the wireless multi-hop network, wherein the cluster includes the apparatus and the source node; and means for transmitting, to the source node, an access response message using the first carrier, wherein the access response message indicates a selected routing option, of a set of routing options, for the source node to use to transmit a data communication to the apparatus using a second carrier.

In some aspects, an apparatus for wireless communication may include means for transmitting, to a destination node, an access request message using a first carrier, wherein the first carrier is to be used for routing decision traffic by each wireless node of a cluster of wireless nodes of the wireless multi-hop network, wherein the cluster includes the apparatus and the destination node; and means for receiving, from the destination node, an access response message using the first carrier, wherein the access response message indicates a selected routing option, of a set of routing options, for the apparatus to use to transmit a data communication to the destination node using a second carrier.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
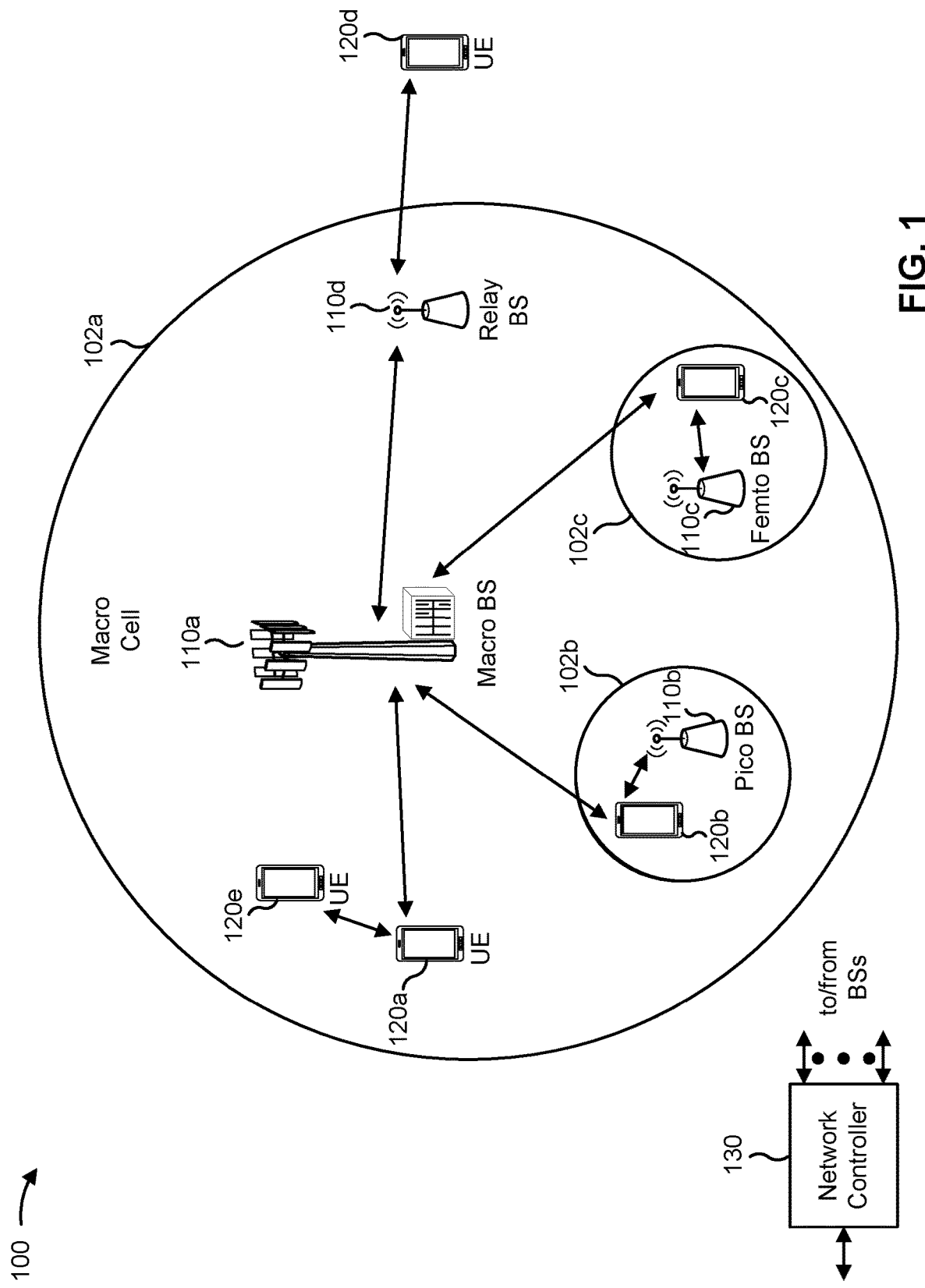
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
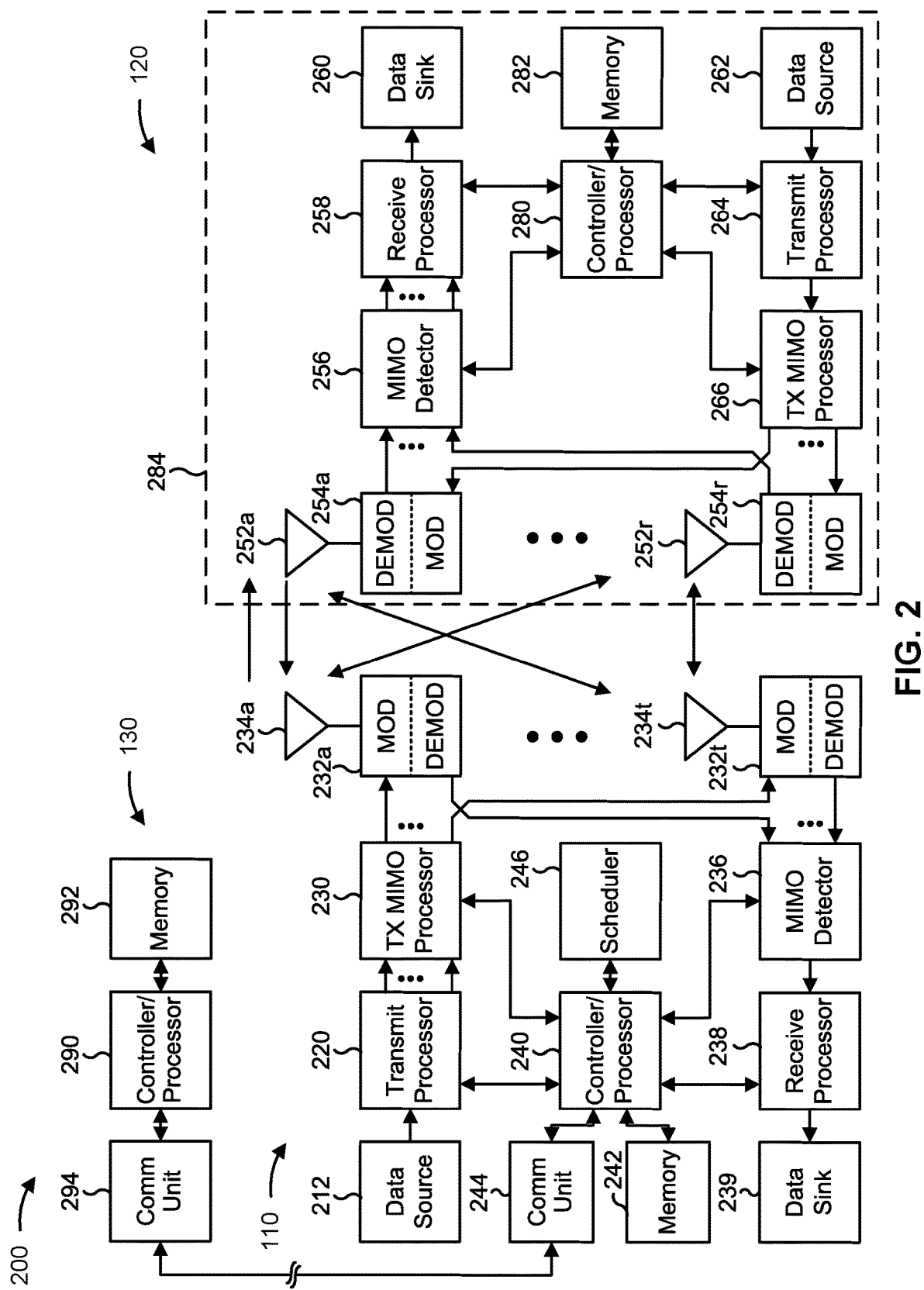
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-7.

Controller/processor 240 of base station 110, controller/processor 280 of UE 120, and/or any other component(s) of FIG. 2 may perform one or more techniques associated with low band assisted routing for multi-hop networks with high band traffic, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, a wireless node (e.g., base station 110, and/or the like) may include means for receiving, from a source node, an access request message using a first carrier, wherein the first carrier is to be used for routing decision traffic by each wireless node of a cluster of wireless nodes of the wireless multi-hop network, wherein the cluster includes the wireless node and the source node, means for transmitting, to the source node, an access response message using the first carrier, wherein the access response message indicates a selected routing option, of a set of routing options, for the source node to use to transmit a data communication to the wireless node using a second carrier, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a wireless node (e.g., base station 110, and/or the like) may include means for transmitting, to a destination node, an access request message using a first carrier, wherein the first carrier is to be used for routing decision traffic by each wireless node of a cluster of wireless nodes of the wireless multi-hop network, wherein the cluster includes the wireless node and the destination node, means for receiving, from the destination node, an access response message using the first carrier, wherein the access response message indicates a selected routing option, of a set of routing options, for the wireless node to use to transmit a data communication to the destination node using a second carrier, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
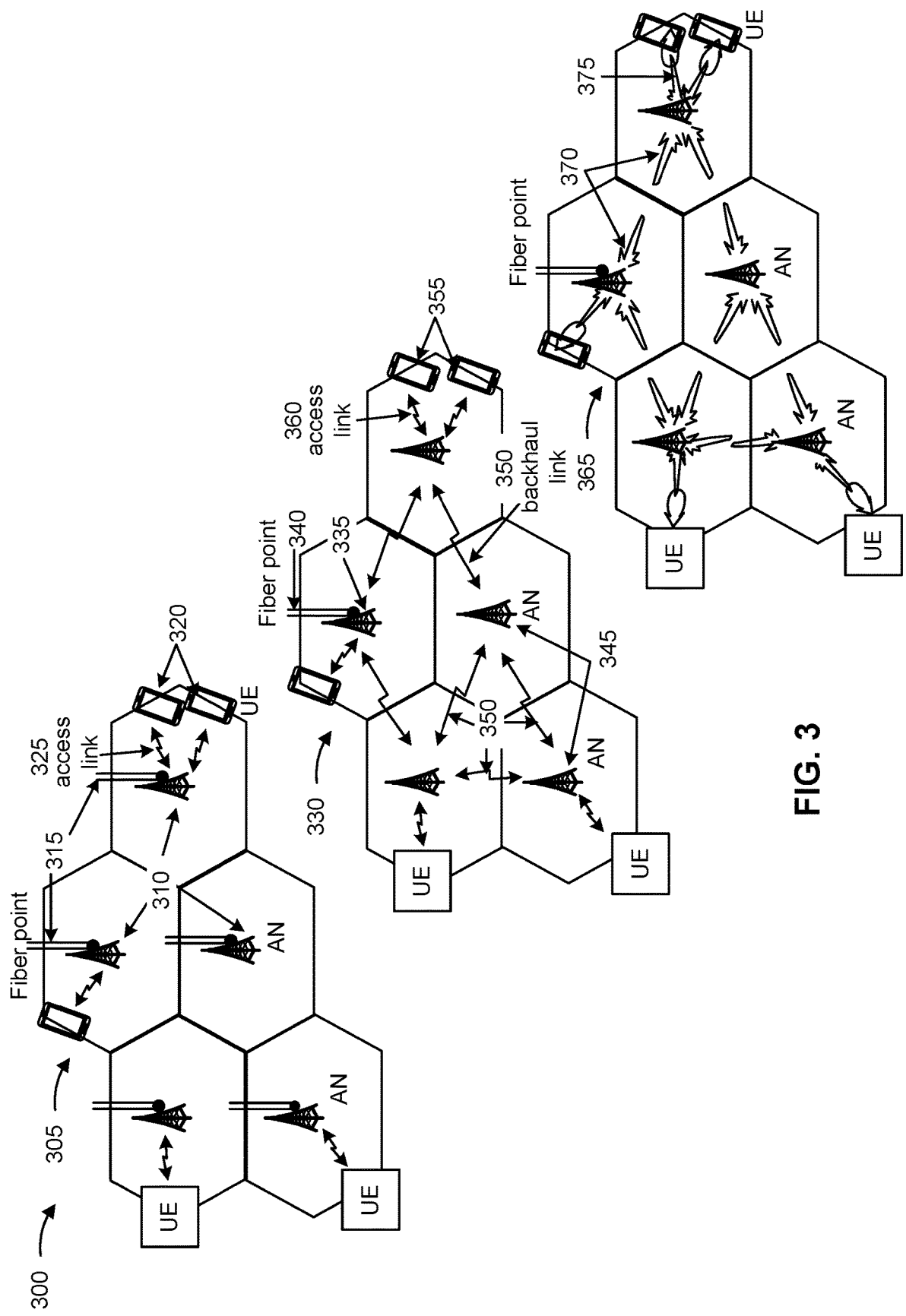
FIG. 3 is a diagram illustrating examples of radio access networks, in accordance with various aspects of the present disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes also referred to as an integrated access and backhaul (IAB) network. An IAB network is a type of wireless multi-hop network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes also referred to as relay base stations, IAB nodes (or IAB-nodes), and/or the like. The non-anchor base station 345 may communicate directly with or indirectly with (e.g., via one or more non-anchor base stations 345) the anchor base station 335 via one or more backhaul links 350 to form a backhaul path (or route) to the core network for carrying backhaul traffic. Backhaul link 350 may be a wireless link.

Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

The development of 5G NR has included the introduction of new frequency bandwidth ("band") ranges for millimeter wave access (as discussed above in connection with the discussion of IAB networks shown in FIG. 3). Further development may include bandwidths that may be as high as 115 gigahertz (GHz). Some bandwidths may include sub-terahertz (THz) spectrum bandwidths that may exceed 180 GHz. These high bands may offer wide bands of spectrum that support high data rates. However, channel conditions in these high bands may limit supported distance ranges for communication links due to channel loss, low non-line of sight performance, and/or the like.

Solutions for overcoming the challenge of limited range include the development of dense networks of nodes connected using a wireless multi-hop topology. In wireless multi-hop networks, a low band may be used to carry control information. The control information may include resource scheduling information. In these networks, latency may be introduced via routing decisions coming from a central node, beam sweeping, congestion at relaying nodes, and/or the like.

According to techniques and apparatuses described herein, a wireless multi-hop network of interconnected wireless nodes may be provided that includes a high band for data traffic and a low band for routing decision traffic. The low band may also be used for control traffic. In some aspects, a destination node may select a routing option, of a set of routing options, for a source node to use to transmit a data communication to the destination node using a high band carrier. The destination node may select the routing option based on a current availability of wireless nodes in a cluster of wireless nodes in the network. In this way, routing decisions may be made with minimal overhead and at or near the time of the data communication. This may facilitate low latency, high throughput multi-hop network performance that increases network capacity and avoids congestion at nodes. In some aspects, use of the low latency carrier for routing decisions, in combination with a high band data carrier, may enable greater geographical coverage. Some aspects of the techniques described herein may enable a fully loaded mesh network topology.

Figure 4:
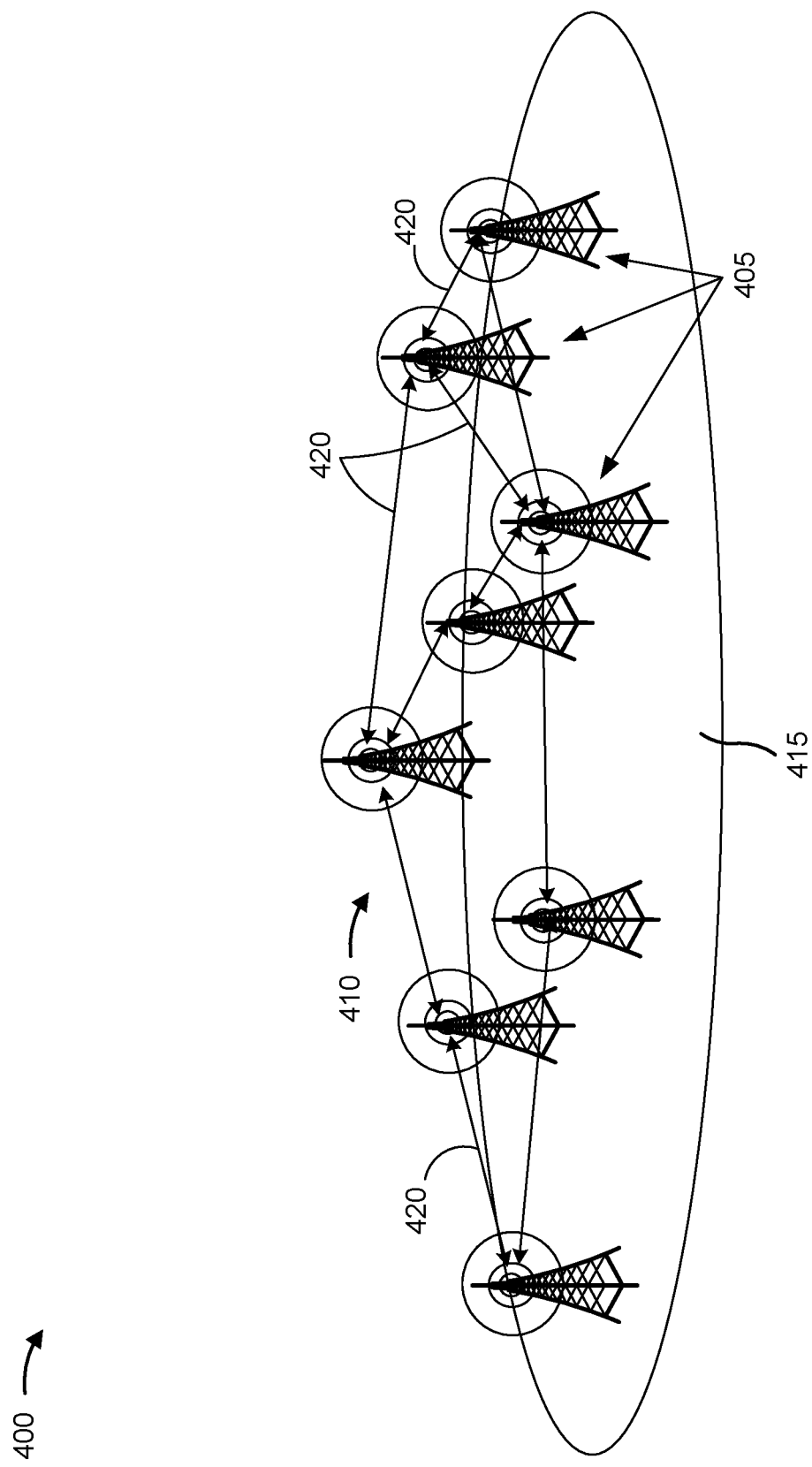
FIGS. 4 and 5 are diagrams illustrating examples of low band assisted routing for multi-hop networks with high band traffic, in accordance with various aspects of the present disclosure.

FIG. 4 is a diagram illustrating an example 400 of low band assisted routing for multi-hop networks with high band traffic, in accordance with various aspects of the present disclosure. As shown, a plurality of wireless nodes 405 may communicate with one another.

As shown by reference number 410, a wireless multi-hop network may include a cluster of wireless nodes 405 that are interconnected by a first carrier 415 (shown as a control plane 415 because the first carrier 415 interconnects each wireless node 405 in the cluster 410 with each other wireless node 405 in the cluster 410). The first carrier 415 may be used for routing decision traffic, control traffic, and/or the like. A second, high band carrier 420 may be used for data traffic. In some aspects, the wireless nodes 405 may use a multiple access routing protocol (described in more detail below in connection with FIG. 5) on the first carrier 415 to facilitate that transmission of data traffic on the second carrier 420.

In some aspects, wireless nodes 405 may include full duplex capability. In some aspects, a wireless node 405 of the cluster 410 of wireless nodes 405 may include an access point node associated with a rack in a data center. In some aspects, the wireless multi-hop network may include an integrated access and backhaul network.

In some aspects, the first carrier 415 and the second carrier 420 may use different frequency ranges. For example, the first carrier 415 may correspond to a low band frequency range and the second carrier 420 may correspond to a high band frequency range. In some aspects, the first carrier 415 may be a sub-7 gigahertz carrier and the second carrier 420 may be a millimeter wave carrier. In some aspects, the second carrier 420 may be a sub-terahertz carrier that corresponds to a frequency range having frequencies greater than 180 GHz. In some aspects, the second carrier 420 may correspond to a frequency between 28 GHz and 115 GHz.

According to various aspects, the wireless multi-hop network may include a direct communication link, using the first carrier 415, between each pair of wireless nodes 405 of the cluster 410 of wireless nodes 405. In some aspects, the wireless multi-hop network may include a direct communication link, using the second carrier 420, between fewer than each pair of wireless nodes 405 of the cluster 410 of wireless nodes 405. However, the wireless multi-hop network may provide a full mesh topology based at least in part on the first carrier 415.

Aspects of the wireless multi-hop network of interconnected wireless nodes 405 described herein may facilitate low latency, high throughput multi-hop network performance that increases network capacity and avoids congestion at nodes 405. In some aspects, use of the low latency carrier 415 for routing decisions, in combination with a high band data carrier 420, may enable greater geographical coverage.

As indicated above, FIG. 4 is provided as an example. Other examples may differ from what is described with regard to FIG. 4.

Figure 5:
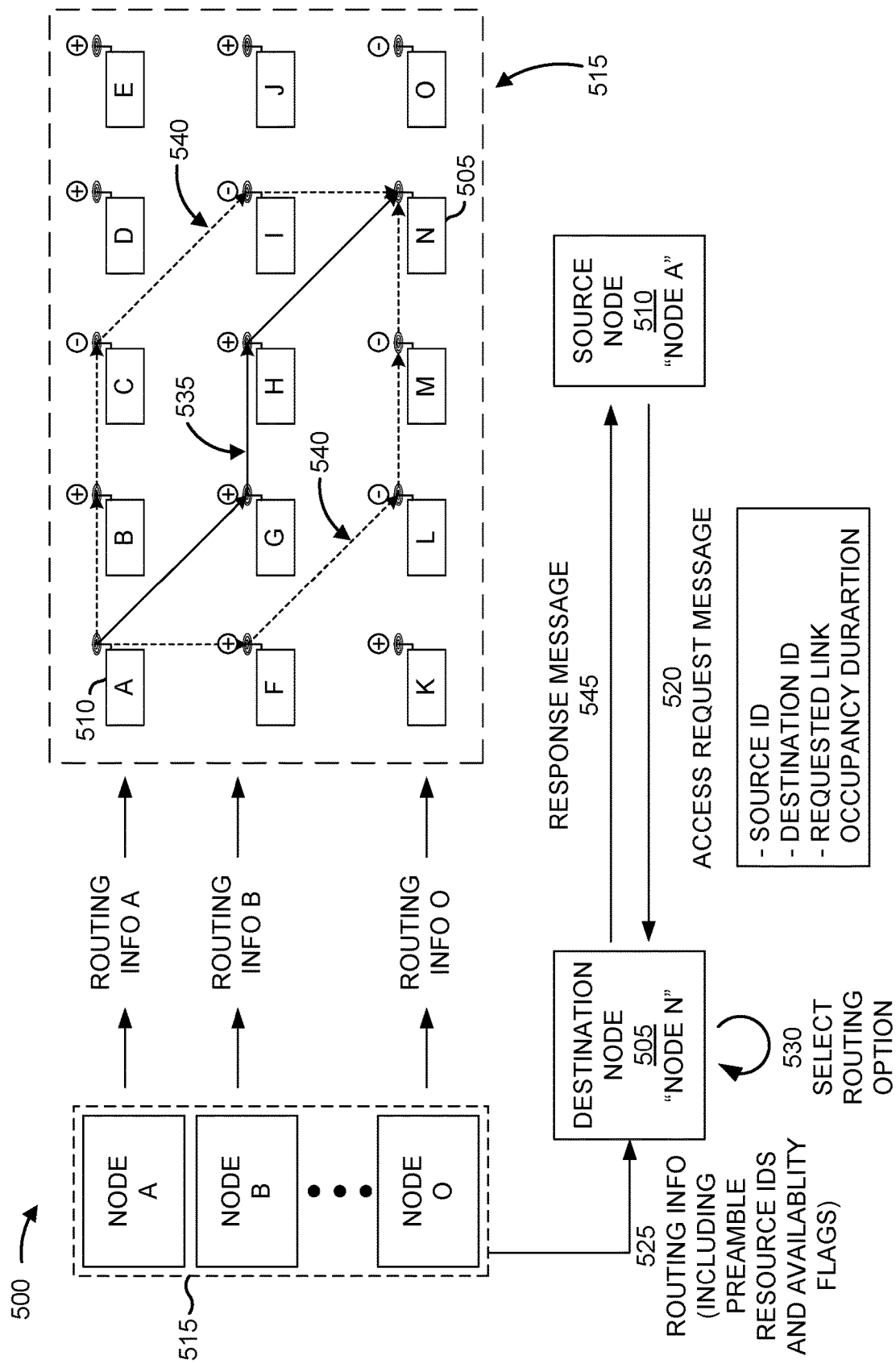

FIG. 5 is a diagram illustrating an example 500 of low band assisted routing for multi-hop networks with high band traffic, in accordance with various aspects of the present disclosure.

As shown, a destination node 505 (shown also as node "N") and a source node 510 (shown also as "NODE A" and node "A") may communicate with one another. In some aspects, the destination node 505 and the source node 510 may be wireless nodes of a cluster 515 of wireless nodes (shown as "NODE A," "NODE B," ... and "NODE O") of a wireless multi-hop network. The wireless multi-hop network may be, include, or be similar to, the wireless multi-hop network described above in connection with FIG. 4.

As shown by reference number 520, the source node 510 may transmit, and the destination node 505 may receive, an access request message. The access request message may be transmitted using a first carrier that is to be used for routing decision traffic by each wireless node of the cluster 515 of wireless nodes. In some aspects, the access request message may include a source identifier (ID) corresponding to the source node 510, a destination ID corresponding to the destination node 505, a requested link occupancy duration indicating a requested time duration for transmitting a data communication using a second carrier, and/or the like. In some aspects, the source node 510 may broadcast the access request message to each other wireless node of the cluster 515 of wireless nodes.

As shown by reference number 525, the wireless nodes of the cluster 515 of wireless nodes may transmit, and the destination node 505 may receive, routing information (shown as "ROUTING INFO"). Each wireless node ("NODE A," "NODE B," "NODE X," and/or the like) may transmit corresponding routing information (shown, respectively, as "ROUTING INFO A," "ROUTING INFO B," and "ROUTING INFO X"). The routing information may include a preamble resource identification, an availability flag, and/or the like. In some aspects, wireless nodes of the cluster 515 of wireless nodes broadcast their corresponding preamble resource identifications to the other wireless nodes of the cluster 515 of wireless nodes.

In some aspects, a preamble resource identification may include a preamble ID, a set of frequency resources associated with the second carrier during a specified time period, a set of spatial resources associated with the second carrier during the specified time period, and/or the like. In some aspects, the specified time period may include a slot.

An availability flag of the plurality of availability flags may be received from the corresponding wireless node of the cluster 515 of wireless nodes. In some aspects, an availability flag may indicate that the corresponding wireless node is available during a specified time period (as shown by a circled plus sign in FIG. 5) or that the corresponding wireless node is not available during the specified time period (as shown by a circled minus sign in FIG. 5). In some aspects, wireless nodes of the cluster 515 of wireless nodes may broadcast their corresponding availability flag to the other wireless nodes of the cluster 515 of wireless nodes.

As shown by reference number 530, the destination node 505 may select a routing option 535 (shown by the solid arrows), of a set of routing options 540 (shown by the dashed arrows), based at least in part on the plurality of preamble resource identifications, the plurality of availability flags, and/or the like. In some aspects, the set of routing options 540 may be maintained using a control plane procedure. In some aspects, the set of routing options 540 may include a plurality of routing options that are ordered based at least in part on a set of quasi-static link parameters corresponding to communication links, associated with the second carrier, between pairs of wireless nodes of the cluster 515 of wireless nodes. In some aspects, the set of quasi-static link parameters may indicate, for one of the communication links, a signal to noise ratio (SNR) associated with the one of the communication links, a latency associated with the one of the communication links, and/or the like.

In some aspects, the set of routing options 540 may be maintained in a look up table that is propagated between each of the wireless nodes of the cluster 515 of wireless nodes. In some aspects, the set of routing options 540 may be updated based at least in part on propagation of an updated look up table.

As shown by reference number 545, the destination node 505 may transmit, and the source node 510 may receive, an access response message using the first carrier. The access response message may indicate the selected routing option 535, of the set of routing options 540, for the source node 510 to use to transmit a data communication to the destination node 505 using the second carrier. In some aspects, the access response message may include a source ID corresponding to the source node 510, a destination ID corresponding to the destination node 505, a granted link occupancy duration indicating a granted time duration for transmitting the data communication, and/or the like. In some aspects, the destination node 505 may broadcast the access response message to each other wireless node of the cluster 515 of wireless nodes to indicate a reserved channel corresponding to the second carrier for the data communication.

According to techniques and apparatuses described above, a wireless multi-hop network of interconnected wireless nodes may be provided that includes a high band for data traffic and a low band for routing decision traffic. The low band may also be used for control traffic. In some aspects, a destination node may select a routing option, of a set of routing options, for a source node to use to transmit a data communication to the destination node using a high band carrier. The destination node may select the routing option based on a current availability of wireless nodes in a cluster of wireless nodes in the network. In this way, routing decisions may be made with minimal overhead and at or near the time of the data communication. This may facilitate low latency, high throughput multi-hop network performance that increases network capacity and avoids congestion at nodes. In some aspects, use of the low latency carrier for routing decisions, in combination with a high band data carrier, may enable greater geographical coverage. Some aspects of the techniques described herein may enable a fully loaded mesh network topology.

As indicated above, FIG. 5 is provided as an example. Other examples may differ from what is described with regard to FIG. 5.

Figure 6:
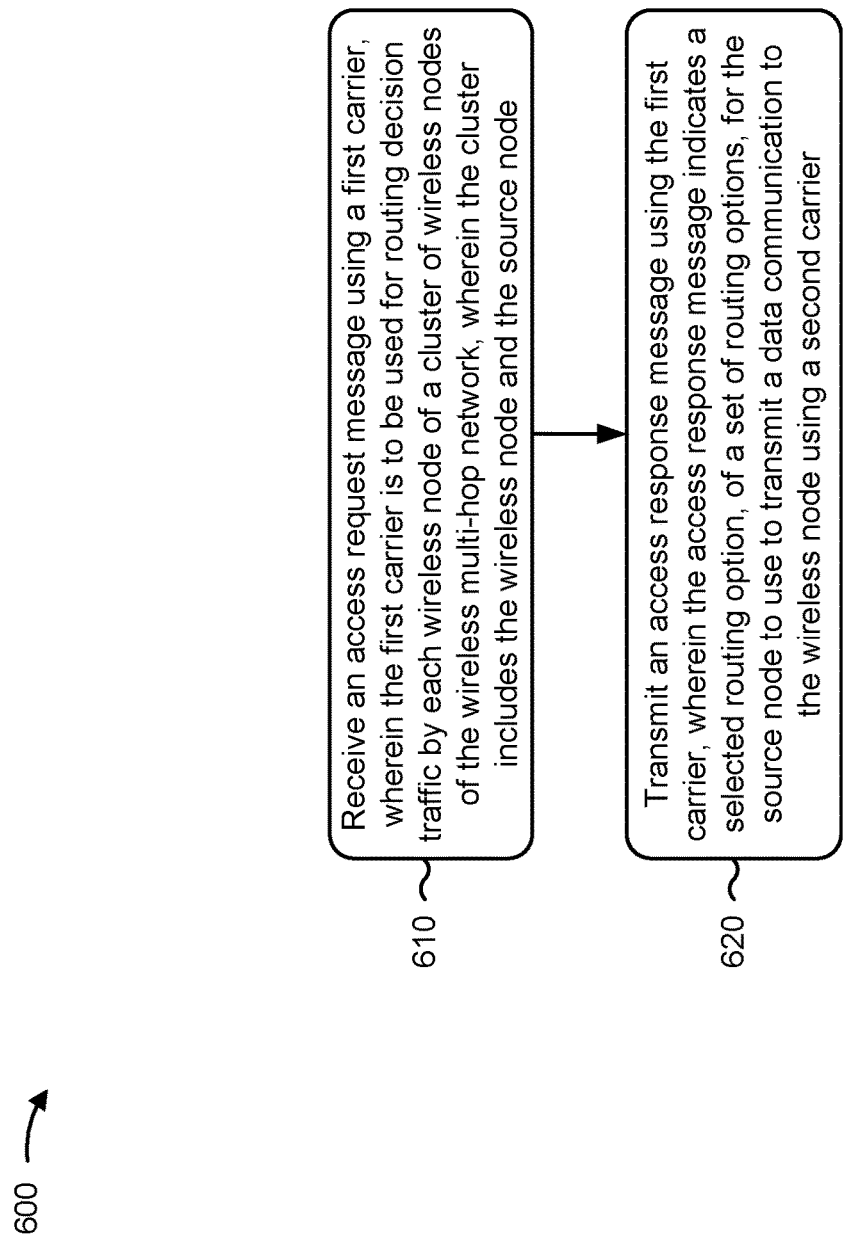
FIGS. 6 and 7 are diagrams illustrating example processes performed, for example, by a wireless node, in accordance with various aspects of the present disclosure.

FIG. 6 is a diagram illustrating an example process 600 performed, for example, by a wireless node, in accordance with various aspects of the present disclosure. Example process 600 is an example where the wireless node (e.g., base station 110, and/or the like) performs operations associated with low band assisted routing for multi-hop networks with high band data traffic.

As shown in FIG. 6, in some aspects, process 600 may include receiving, from a source node, an access request message using a first carrier, wherein the first carrier is to be used for routing decision traffic by each wireless node of a cluster of wireless nodes of the wireless multi-hop network, wherein the cluster includes the wireless node and the source node (block 610). For example, the wireless node (e.g., using e.g., using receive processor 238, controller/processor 240, memory 242, and/or the like) may receive, from a source node, an access request message using a first carrier, as described above. In some aspects, the first carrier is to be used for routing decision traffic by each wireless node of a cluster of wireless nodes of the wireless multi-hop network. In some aspects, the cluster includes the wireless node and the source node.

As further shown in FIG. 6, in some aspects, process 600 may include transmitting, to the source node, an access response message using the first carrier, wherein the access response message indicates a selected routing option, of a set of routing options, for the source node to use to transmit a data communication to the wireless node using a second carrier (block 620). For example, the wireless node (e.g., using transmit processor 220, controller/processor 240, memory 242, and/or the like) may transmit, to the source node, an access response message using the first carrier, as described above. In some aspects, the access response message indicates a selected routing option, of a set of routing options, for the source node to use to transmit a data communication to the wireless node using a second carrier.

Process 600 may include additional aspects, such as any single aspect or any combination of aspects described below and/or in connection with one or more other processes described elsewhere herein.

In a first aspect, process 600 includes receiving, from the source node, the data communication using the second carrier.

In a second aspect, alone or in combination with the first aspect, the first carrier is to be used for control traffic.

In a third aspect, alone or in combination with one or more of the first and second aspects, the second carrier is to be used for data traffic.

In a fourth aspect, alone or in combination with one or more of the first through third aspects, the first carrier and the second carrier use different frequency ranges.

In a fifth aspect, alone or in combination with one or more of the first through fourth aspects, the first carrier corresponds to a low band frequency range and the second carrier corresponds to a high band frequency range.

In a sixth aspect, alone or in combination with one or more of the first through fifth aspects, the first carrier is a sub-7 gigahertz carrier and the second carrier is a millimeter wave carrier.

In a seventh aspect, alone or in combination with one or more of the first through fifth aspects, the second carrier is a sub-terahertz carrier that corresponds to a frequency range having frequencies greater than 180 gigahertz.

In an eighth aspect, alone or in combination with one or more of the first through fifth aspects, the second carrier corresponds to a frequency between 28 gigahertz and 115 gigahertz.

In a ninth aspect, alone or in combination with one or more of the first through eighth aspects, each wireless node of the cluster of wireless nodes comprises full duplex capability.

In a tenth aspect, alone or in combination with one or more of the first through ninth aspects, the wireless multi-hop network comprises a direct communication link, using the first carrier, between each pair of wireless nodes of the cluster of wireless nodes.

In an eleventh aspect, alone or in combination with the tenth aspect, the wireless multi-hop network provides a full mesh topology based at least in part on the first carrier.

In a twelfth aspect, alone or in combination with one or more of the first through eleventh aspects, the wireless multi-hop network comprises a direct communication link, using the second carrier, between fewer than each pair of wireless nodes of the cluster of wireless nodes.

In a thirteenth aspect, alone or in combination with one or more of the first through twelfth aspects, process 600 includes receiving a plurality of preamble resource identifications, wherein a preamble resource identification of the plurality of preamble resource identifications is being received from a corresponding wireless node of the cluster of wireless nodes; and selecting the selected routing option based at least in part on the plurality of preamble resource identifications.

In a fourteenth aspect, alone or in combination with the thirteenth aspect, the preamble resource identification of the plurality of preamble resource identifications indicates at least one of: a preamble identifier, a set of frequency resources associated with the second carrier during a specified time period, a set of spatial resources associated with the second carrier during the specified time period, or a combination thereof.

In a fifteenth aspect, alone or in combination with the fourteenth aspect, the specified time period comprises a slot.

In a sixteenth aspect, alone or in combination with one or more of the thirteenth through fifteenth aspects, the corresponding wireless node of the cluster of wireless nodes is to broadcast the preamble resource identification to each other wireless node of the cluster of wireless nodes.

In a seventeenth aspect, alone or in combination with one or more of the first through sixteenth aspects, process 600 includes receiving a plurality of availability flags, wherein an availability flag of the plurality of availability flags is received from the corresponding wireless node of the cluster of wireless nodes, wherein the availability flag indicates whether the corresponding wireless node is available during the specified time period, and wherein the selected routing option is based at least in part on the plurality of availability flags.

In an eighteenth aspect, alone or in combination with the seventeenth aspect, the corresponding wireless node of the cluster of wireless nodes is to broadcast the availability flag to each other wireless node of the cluster of wireless nodes.

In a nineteenth aspect, alone or in combination with one or more of the first through eighteenth aspects, the access request message comprises at least one of: a source identifier corresponding to the source node, a destination identifier corresponding to the wireless node, a requested link occupancy duration indicating a requested time duration for transmitting the data communication, or a combination thereof.

In a twentieth aspect, alone or in combination with one or more of the first through nineteenth aspects, the source node is to broadcast the access request message to each other wireless node of the cluster of wireless nodes.

In a twenty-first aspect, alone or in combination with one or more of the first through twentieth aspects, the access response message comprises at least one of a source identifier corresponding to the source node, a destination identifier corresponding to the wireless node, a granted link occupancy duration indicating a granted time duration for transmitting the data communication, or a combination thereof.

In a twenty-second aspect, alone or in combination with one or more of the first through twenty-first aspects, transmitting the access response message comprises broadcasting the access response message to each other wireless node of the cluster of wireless nodes.

In a twenty-third aspect, alone or in combination with one or more of the first through twenty-second aspects, the access response message indicates a reserved channel corresponding to the second carrier for the data communication.

In a twenty-fourth aspect, alone or in combination with one or more of the first through twenty-third aspects, the set of routing options is maintained using a control plane procedure.

In a twenty-fifth aspect, alone or in combination with the twenty-fourth aspect, the set of routing options comprises a plurality of routing options that are ordered based at least in part on a set of quasi-static link parameters corresponding to communication links between pairs of wireless nodes of the cluster of wireless nodes, the communication links are associated with the second carrier.

In a twenty-sixth aspect, alone or in combination with the twenty-fifth aspect, the set of quasi-static link parameters indicates, for one of the communication links, at least one of a signal to noise ratio associated with the one of the communication links, a latency associated with the one of the communication links, or a combination thereof.

In a twenty-seventh aspect, alone or in combination with one or more of the first through twenty-sixth aspects, the set of routing options is maintained in a look up table that is propagated between each of the wireless nodes of the cluster of wireless nodes.

In a twenty-eighth aspect, alone or in combination with one or more of the first through twenty-seventh aspects, the set of routing options is updated based at least in part on propagation of an updated look up table.

In a twenty-ninth aspect, alone or in combination with one or more of the first through twenty-eighth aspects, process 600 includes selecting the selected routing option by disqualifying unavailable routing options of the set of routing options.

In a thirtieth aspect, alone or in combination with one or more of the first through twenty-ninth aspects, the selected routing option corresponds to a specified time period having a duration of a specified quantity of microseconds.

In a thirty-first aspect, alone or in combination with one or more of the first through thirtieth aspects, a wireless node of the cluster of wireless nodes comprises an access point node associated with a rack in a data center.

In a thirty-second aspect, alone or in combination with one or more of the first through thirtieth aspects, the wireless multi-hop network comprises an integrated access and backhaul network.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
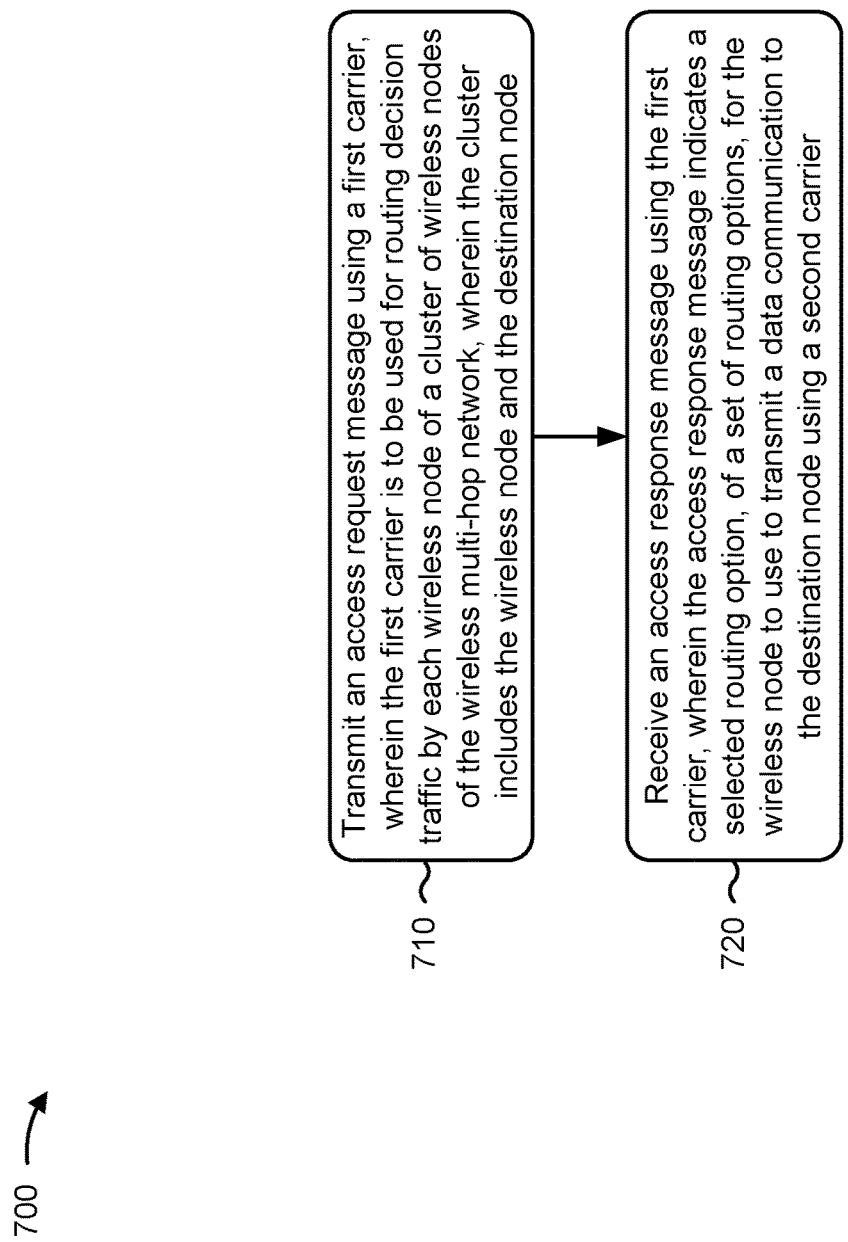

FIG. 7 is a diagram illustrating an example process 700 performed, for example, by a wireless node, in accordance with various aspects of the present disclosure. Example process 700 is an example where the wireless node (e.g., base station 110, and/or the like) performs operations associated with low band assisted routing for multi-hop networks with high band data traffic.

As shown in FIG. 7, in some aspects, process 700 may include transmitting, to a destination node, an access request message using a first carrier, wherein the first carrier is to be used for routing decision traffic by each wireless node of a cluster of wireless nodes of the wireless multi-hop network, wherein the cluster includes the wireless node and the destination node (block 710). For example, the wireless node (e.g., using e.g., using transmit processor 220, controller/processor 240, memory 242, and/or the like) may transmit, to a destination node, an access request message using a first carrier, as described above. In some aspects, the first carrier is to be used for routing decision traffic by each wireless node of a cluster of wireless nodes of the wireless multi-hop network. In some aspects, the cluster includes the wireless node and the destination node.

As further shown in FIG. 7, in some aspects, process 700 may include receiving, from the destination node, an access response message using the first carrier, wherein the access response message indicates a selected routing option, of a set of routing options, for the wireless node to use to transmit a data communication to the destination node using a second carrier (block 720). For example, the wireless node (e.g., using e.g., using receive processor 238, controller/processor 240, memory 242, and/or the like) may receive, from the destination node, an access response message using the first carrier, as described above. In some aspects, the access response message indicates a selected routing option, of a set of routing options, for the wireless node to use to transmit a data communication to the destination node using a second carrier.

Process 700 may include additional aspects, such as any single aspect or any combination of aspects described below and/or in connection with one or more other processes described elsewhere herein.

In a first aspect, process 700 includes transmitting, to the destination node, the data communication using the second carrier.

In a second aspect, alone or in combination with the first aspect, the first carrier is to be used for control traffic.

In a third aspect, alone or in combination with one or more of the first and second aspects, the second carrier is to be used for data traffic.

In a fourth aspect, alone or in combination with one or more of the first through third aspects, the first carrier and the second carrier use different frequency ranges.

In a fifth aspect, alone or in combination with one or more of the first through fourth aspects, the first carrier corresponds to a low band frequency range and the second carrier corresponds to a high band frequency range.

In a sixth aspect, alone or in combination with one or more of the first through fifth aspects, the first carrier is a sub-7 gigahertz carrier and the second carrier is a millimeter wave carrier.

In a seventh aspect, alone or in combination with one or more of the first through fifth aspects, the second carrier is a sub-terahertz carrier that corresponds to a frequency range having frequencies greater than 180 gigahertz.

In an eighth aspect, alone or in combination with one or more of the first through fifth aspects, the second carrier corresponds to a frequency between 28 gigahertz and 115 gigahertz.

In a ninth aspect, alone or in combination with one or more of the first through eighth aspects, each wireless node of the cluster of wireless nodes comprises full duplex capability.

In a tenth aspect, alone or in combination with one or more of the first through ninth aspects, the wireless multi-hop network comprises a direct communication link, using the first carrier, between each pair of wireless nodes of the cluster of wireless nodes.

In an eleventh aspect, alone or in combination with the tenth aspect, the wireless multi-hop network provides a full mesh topology based at least in part on the first carrier.

In a twelfth aspect, alone or in combination with one or more of the first through eleventh aspects, the wireless multi-hop network comprises a direct communication link, using the second carrier, between fewer than each pair of wireless nodes of the cluster of wireless nodes.

In a thirteenth aspect, alone or in combination with one or more of the first through twelfth aspects, process 700 includes transmitting, to the destination node, a preamble resource identification, wherein the preamble resource identification is used by the destination node in selecting the selected routing option.

In a fourteenth aspect, alone or in combination with the thirteenth aspect, the preamble resource identification indicates at least one of a preamble identifier, a set of frequency resources associated with the second carrier during a specified time period, a set of spatial resources associated with the second carrier during the specified time period, or a combination thereof.

In a fifteenth aspect, alone or in combination with the fourteenth aspect, the specified time period comprises a slot.

In a sixteenth aspect, alone or in combination with one or more of the thirteenth through fifteenth aspects, wireless nodes of the cluster of wireless nodes are to broadcast corresponding preamble resource identifications to each other wireless node of the cluster of wireless nodes.

In a seventeenth aspect, alone or in combination with one or more of the first through sixteenth aspects, process 700 includes transmitting an availability flag that indicates whether the wireless node is available during the specified time period, wherein the destination node uses the availability flag in selecting the selected routing option.

In an eighteenth aspect, alone or in combination with one or more of the first through seventeenth aspects, wireless nodes of the cluster of wireless nodes are to broadcast corresponding availability flags to each other wireless node of the cluster of wireless nodes.

In a nineteenth aspect, alone or in combination with one or more of the first through eighteenth aspects, the access request message comprises at least one of a source identifier corresponding to the wireless node, a destination identifier corresponding to the destination node, a requested link occupancy duration indicating a requested time duration for transmitting the data communication, or a combination thereof.

In a twentieth aspect, alone or in combination with one or more of the first through nineteenth aspects, the wireless node is to broadcast the access request message to each other wireless node of the cluster of wireless nodes.

In a twenty-first aspect, alone or in combination with one or more of the first through twentieth aspects, the access response message comprises at least one of a source identifier corresponding to the wireless node, a destination identifier corresponding to the wireless node, a granted link occupancy duration indicating a granted time duration for transmitting the data communication, or a combination thereof.

In a twenty-second aspect, alone or in combination with one or more of the first through twenty-first aspects, the access response message is to be broadcast by the destination node to each other wireless node of the cluster of wireless nodes.

In a twenty-third aspect, alone or in combination with one or more of the first through twenty-second aspects, the access response message indicates a reserved channel corresponding to the second carrier for the data communication.

In a twenty-fourth aspect, alone or in combination with one or more of the first through twenty-third aspects, the set of routing options is maintained using a control plane procedure.

In a twenty-fifth aspect, alone or in combination with the twenty-fourth aspect, the set of routing options comprises a plurality of routing options that are ordered based at least in part on a set of quasi-static link parameters corresponding to communication links between pairs of wireless nodes of the cluster of wireless nodes, the communication links are associated with the second carrier.

In a twenty-sixth aspect, alone or in combination with the twenty-fifth aspect, the set of quasi-static link parameters indicates, for one of the communication links, at least one of a signal to noise ratio associated with the one of the communication links, a latency associated with the one of the communication links, or a combination thereof.

In a twenty-seventh aspect, alone or in combination with one or more of the first through twenty-sixth aspects, the set of routing options is maintained in a look up table that is propagated between each of the wireless nodes of the cluster of wireless nodes.

In a twenty-eighth aspect, alone or in combination with one or more of the first through twenty-seventh aspects, the set of routing options is updated based at least in part on propagation of an updated look up table.

In a twenty-ninth aspect, alone or in combination with one or more of the first through twenty-eighth aspects, the selected routing option is selected by disqualifying unavailable routing options of the set of routing options.

In a thirtieth aspect, alone or in combination with one or more of the first through twenty-ninth aspects, the selected routing option corresponds to a specified time period having a duration of a specified quantity of microseconds.

In a thirty-first aspect, alone or in combination with one or more of the first through thirtieth aspects, a wireless node of the cluster of wireless nodes comprises an access point node associated with a rack in a data center.

In a thirty-second aspect, alone or in combination with one or more of the first through thirtieth aspects, the wireless multi-hop network comprises an integrated access and backhaul network.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some aspects of the present disclosure:

Aspect 1: A method of wireless communication performed by a wireless node in a wireless multi-hop network, comprising: receiving, from a source node, an access request message using a first carrier, wherein the first carrier is to be used for routing decision traffic by each wireless node of a cluster of wireless nodes of the wireless multi-hop network, wherein the cluster includes the wireless node and the source node; and transmitting, to the source node, an access response message using the first carrier, wherein the access response message indicates a selected routing option, of a set of routing options, for the source node to use to transmit a data communication to the wireless node using a second carrier.

Aspect 2: The method of aspect 1, further comprising receiving, from the source node, the data communication using the second carrier.

Aspect 3: The method of either of aspects 1 or 2, wherein the first carrier is to be used for control traffic.

Aspect 4: The method of any of aspects 1-3, wherein the second carrier is to be used for data traffic.

Aspect 5: The method of any of aspects 1-4, wherein the first carrier and the second carrier use different frequency ranges.

Aspect 6: The method of any of aspects 1-5, wherein the first carrier corresponds to a low band frequency range and the second carrier corresponds to a high band frequency range.

Aspect 7: The method of any of aspects 1-6, wherein the first carrier is a sub-7 gigahertz carrier and the second carrier is a millimeter wave carrier.

Aspect 8: The method of any of aspects 1-6, wherein the second carrier is a sub-terahertz carrier that corresponds to a frequency range having frequencies greater than 180 gigahertz.

Aspect 9: The method of any of aspects 1-6, wherein the second carrier corresponds to a frequency between 28 gigahertz and 115 gigahertz.

Aspect 10: The method of any of aspects 1-9, wherein each wireless node of the cluster of wireless nodes comprises full duplex capability.

Aspect 11: The method of any of aspects 1-10, wherein the wireless multi-hop network comprises a direct communication link, using the first carrier, between each pair of wireless nodes of the cluster of wireless nodes.

Aspect 12: The method of aspect 11, wherein the wireless multi-hop network provides a full mesh topology based at least in part on the first carrier.

Aspect 13: The method of any of aspects 1-12, wherein the wireless multi-hop network comprises a direct communication link, using the second carrier, between fewer than each pair of wireless nodes of the cluster of wireless nodes.

Aspect 14: The method of any of aspects 1-13, further comprising: receiving a plurality of preamble resource identifications, wherein a preamble resource identification of the plurality of preamble resource identifications is received from a corresponding wireless node of the cluster of wireless nodes; and selecting the selected routing option based at least in part on the plurality of preamble resource identifications.

Aspect 15: The method of aspect 14, wherein the preamble resource identification of the plurality of preamble resource identifications indicates at least one of: a preamble identifier, a set of frequency resources associated with the second carrier during a specified time period, a set of spatial resources associated with the second carrier during the specified time period, or a combination thereof.

Aspect 16: The method of aspect 15, wherein the specified time period comprises a slot.

Aspect 17: The method of any of aspects 14-16, wherein the corresponding wireless node of the cluster of wireless nodes is to broadcast the preamble resource identification to each other wireless node of the cluster of wireless nodes.

Aspect 18: The method of any of aspects 1-17, further comprising: receiving a plurality of availability flags, wherein an availability flag of the plurality of availability flags is received from a corresponding wireless node of the cluster of wireless nodes, wherein the availability flag indicates whether the corresponding wireless node is available during a specified time period, and wherein the selected routing option is based at least in part on the plurality of availability flags.

Aspect 19: The method of aspect 18, wherein the corresponding wireless node of the cluster of wireless nodes is to broadcast the availability flag to each other wireless node of the cluster of wireless nodes.

Aspect 20: The method of any of aspects 1-19, wherein the access request message comprises at least one of: a source identifier corresponding to the source node, a destination identifier corresponding to the wireless node, a requested link occupancy duration indicating a requested time duration for transmitting the data communication, or a combination thereof.

Aspect 21: The method of any of aspects 1-20, wherein the source node is to broadcast the access request message to each other wireless node of the cluster of wireless nodes.

Aspect 22: The method of any of aspects 1-21, wherein the access response message comprises at least one of: a source identifier corresponding to the source node, a destination identifier corresponding to the wireless node, a granted link occupancy duration indicating a granted time duration for transmitting the data communication, or a combination thereof.

Aspect 23: The method of any of aspects 1-22, wherein transmitting the access response message comprises broadcasting the access response message to each other wireless node of the cluster of wireless nodes.

Aspect 24: The method of any of aspects 1-23, wherein the access response message indicates a reserved channel corresponding to the second carrier for the data communication.

Aspect 25: The method of any of aspects 1-24, wherein the set of routing options is maintained using a control plane procedure.

Aspect 26: The method of aspect 25, wherein the set of routing options comprises a plurality of routing options that are ordered based at least in part on a set of quasi-static link parameters corresponding to communication links between pairs of wireless nodes of the cluster of wireless nodes, wherein the communication links are associated with the second carrier.

Aspect 27: The method of aspect 26, wherein the set of quasi-static link parameters indicates, for one of the communication links, at least one of: a signal to noise ratio associated with the one of the communication links, a latency associated with the one of the communication links, or a combination thereof.

Aspect 28: The method of any of aspects 1-27, wherein the set of routing options is maintained in a look up table that is propagated between each of the wireless nodes of the cluster of wireless nodes.

Aspect 29: The method of any of aspects 1-28, wherein the set of routing options is updated based at least in part on propagation of an updated look up table.

Aspect 30: The method of any of aspects 1-29, further comprising selecting the selected routing option by disqualifying unavailable routing options of the set of routing options.

Aspect 31: The method of any of aspects 1-30, wherein the selected routing option corresponds to a specified time period having a duration of a specified quantity of microseconds.

Aspect 32: The method of any of aspects 1-31, wherein a wireless node of the cluster of wireless nodes comprises an access point node associated with a rack in a data center.

Aspect 33: The method of any of aspects 1-31, wherein the wireless multi-hop network comprises an integrated access and backhaul network.

Aspect 34: A method of wireless communication performed by a wireless node in a wireless multi-hop network, comprising: transmitting, to a destination node, an access request message using a first carrier, wherein the first carrier is to be used for routing decision traffic by each wireless node of a cluster of wireless nodes of the wireless multi-hop network, wherein the cluster includes the wireless node and the destination node; and receiving, from the destination node, an access response message using the first carrier, wherein the access response message indicates a selected routing option, of a set of routing options, for the wireless node to use to transmit a data communication to the destination node using a second carrier.

Aspect 35: The method of aspect 34, further comprising transmitting, to the destination node, the data communication using the second carrier.

Aspect 36: The method of either of aspects 34 or 35, wherein the first carrier is to be used for control traffic.

Aspect 37: The method of any of aspects 34-36, wherein the second carrier is to be used for data traffic.

Aspect 38: The method of any of aspects 34-37, wherein the first carrier and the second carrier use different frequency ranges.

Aspect 39: The method of any of aspects 34-38, wherein the first carrier corresponds to a low band frequency range and the second carrier corresponds to a high band frequency range.

Aspect 40: The method of any of aspects 34-39, wherein the first carrier is a sub-7 gigahertz carrier and the second carrier is a millimeter wave carrier.

Aspect 41: The method of any of aspects 34-39, wherein the second carrier is a sub-terahertz carrier that corresponds to a frequency range having frequencies greater than 180 gigahertz.

Aspect 42: The method of any of aspects 34-39, wherein the second carrier corresponds to a frequency between 28 gigahertz and 115 gigahertz.

Aspect 43: The method of any of aspects 34-42, wherein each wireless node of the cluster of wireless nodes comprises full duplex capability.

Aspect 44: The method of any of aspects 34-43, wherein the wireless multi-hop network comprises a direct communication link, using the first carrier, between each pair of wireless nodes of the cluster of wireless nodes.

Aspect 45: The method of aspect 44, wherein the wireless multi-hop network provides a full mesh topology based at least in part on the first carrier.

Aspect 46: The method of any of aspects 34-45, wherein the wireless multi-hop network comprises a direct communication link, using the second carrier, between fewer than each pair of wireless nodes of the cluster of wireless nodes.

Aspect 47: The method of any of aspects 34-46, further comprising: transmitting, to the destination node, a preamble resource identification, wherein the preamble resource identification is used by the destination node in selecting the selected routing option.

Aspect 48: The method of aspect 47, wherein the preamble resource identification indicates at least one of: a preamble identifier, a set of frequency resources associated with the second carrier during a specified time period, a set of spatial resources associated with the second carrier during the specified time period, or a combination thereof.

Aspect 49: The method of aspect 48, wherein the specified time period comprises a slot.

Aspect 50: The method of any of aspects 47-49, wherein wireless nodes of the cluster of wireless nodes are to broadcast corresponding preamble resource identifications to each other wireless node of the cluster of wireless nodes.

Aspect 51: The method of any of aspects 34-50, further comprising: transmitting an availability flag that indicates whether the wireless node is available during a specified time period, wherein the destination node uses the availability flag in selecting the selected routing option.

Aspect 52: The method of any of aspects 34-51, wherein wireless nodes of the cluster of wireless nodes are to broadcast corresponding availability flags to each other wireless node of the cluster of wireless nodes.

Aspect 53: The method of any of aspects 34-52, wherein the access request message comprises at least one of: a source identifier corresponding to the wireless node, a destination identifier corresponding to the destination node, a requested link occupancy duration indicating a requested time duration for transmitting the data communication, or a combination thereof.

Aspect 54: The method of any of aspects 34-53, wherein the wireless node is to broadcast the access request message to each other wireless node of the cluster of wireless nodes.

Aspect 55: The method of any of aspects 34-54, wherein the access response message comprises at least one of: a source identifier corresponding to the wireless node, a destination identifier corresponding to the wireless node, a granted link occupancy duration indicating a granted time duration for transmitting the data communication, or a combination thereof.

Aspect 56: The method of any of aspects 34-55, wherein the access response message is to be broadcast by the destination node to each other wireless node of the cluster of wireless nodes.

Aspect 57: The method of any of aspects 34-56, wherein the access response message indicates a reserved channel corresponding to the second carrier for the data communication.

Aspect 58: The method of any of aspects 34-57, wherein the set of routing options is maintained using a control plane procedure.

Aspect 59: The method of aspect 58, wherein the set of routing options comprises a plurality of routing options that are ordered based at least in part on a set of quasi-static link parameters corresponding to communication links between pairs of wireless nodes of the cluster of wireless nodes, wherein the communication links are associated with the second carrier.

Aspect 60: The method of aspect 59, wherein the set of quasi-static link parameters indicates, for one of the communication links, at least one of: a signal to noise ratio associated with the one of the communication links, a latency associated with the one of the communication links, or a combination thereof.

Aspect 61: The method of any of aspects 34-60, wherein the set of routing options is maintained in a look up table that is propagated between each of the wireless nodes of the cluster of wireless nodes.

Aspect 62: The method of any of aspects 34-61, wherein the set of routing options is updated based at least in part on propagation of an updated look up table.

Aspect 63: The method of any of aspects 34-62, wherein the selected routing option is selected by disqualifying unavailable routing options of the set of routing options.

Aspect 64: The method of any of aspects 34-63, wherein the selected routing option corresponds to a specified time period having a duration of a specified quantity of microseconds.

Aspect 65: The method of any of aspects 34-64, wherein a wireless node of the cluster of wireless nodes comprises an access point node associated with a rack in a data center.

Aspect 66: The method of any of aspects 34-64, wherein the wireless multi-hop network comprises an integrated access and backhaul network.

Aspect 67: An apparatus for wireless communication at a device, comprising a processor; memory coupled with the processor; and instructions stored in the memory and executable by the processor to cause the apparatus to perform the method of one or more aspects of aspects 1-33.

Aspect 68: A device for wireless communication, comprising a memory and one or more processors coupled to the memory, the memory and the one or more processors configured to perform the method of one or more aspects of aspects 1-33.

Aspect 69: An apparatus for wireless communication, comprising at least one means for performing the method of one or more aspects of aspects 1-33.

Aspect 70: A non-transitory computer-readable medium storing code for wireless communication, the code comprising instructions executable by a processor to perform the method of one or more aspects of aspects 1-33.

Aspect 71: A non-transitory computer-readable medium storing a set of instructions for wireless communication, the set of instructions comprising one or more instructions that, when executed by one or more processors of a device, cause the device to perform the method of one or more aspects of aspects 1-33.

Aspect 72: An apparatus for wireless communication at a device, comprising a processor; memory coupled with the processor; and instructions stored in the memory and executable by the processor to cause the apparatus to perform the method of one or more aspects of aspects 34-66.

Aspect 73: A device for wireless communication, comprising a memory and one or more processors coupled to the memory, the memory and the one or more processors configured to perform the method of one or more aspects of aspects 34-66.

Aspect 74: An apparatus for wireless communication, comprising at least one means for performing the method of one or more aspects of aspects 34-66.

Aspect 75: A non-transitory computer-readable medium storing code for wireless communication, the code comprising instructions executable by a processor to perform the method of one or more aspects of aspects 34-66.

Aspect 76: A non-transitory computer-readable medium storing a set of instructions for wireless communication, the set of instructions comprising one or more instructions that, when executed by one or more processors of a device, cause the device to perform the method of one or more aspects of aspects 34-66.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless node for wireless communication in a wireless multi-hop network, comprising:
   a memory; and
   one or more processors coupled to the memory, the one or more processors configured to cause the wireless node to:
      receive, from a source node, an access request message using a first carrier, wherein the first carrier is to be used for routing decision traffic by each wireless node of a cluster of wireless nodes of the wireless multi-hop network, wherein the cluster includes the wireless node and the source node, and wherein the source node is an integrated access and backhaul (IAB) node of an IAB network in the wireless multi-hop network; and transmit, to the source node, an access response message using the first carrier, wherein the access response message indicates a selected routing option, of a set of routing options, for the source node to use to transmit a data communication to the wireless node using a second carrier, wherein the set of routing options is maintained using a control plane procedure, and wherein the set of routing options comprises a plurality of routing options that are ordered based at least in part on a set of quasi-static link parameters corresponding to communication links between pairs of wireless nodes of the cluster of wireless nodes, wherein the communication links are associated with the second carrier.

2. The wireless node of claim 1, wherein the one or more processors are further configured to cause the wireless node to:
receive, from the source node, the data communication using the second carrier, wherein the first carrier is to be used for control traffic, wherein the second carrier is to be used for data traffic, and wherein the first carrier and the second carrier use different frequency ranges.

3. The wireless node of claim 1, wherein the first carrier corresponds to a low band frequency range and the second carrier corresponds to a high band frequency range.

4. The wireless node of claim 1, wherein each wireless node of the cluster of wireless nodes comprises full duplex capability.

5. The wireless node of claim 1, wherein the wireless multi-hop network comprises a direct communication link, using the first carrier, between each pair of wireless nodes of the cluster of wireless nodes.

6. The wireless node of claim 1, wherein the wireless multi-hop network provides a full mesh topology based at least in part on the first carrier.

7. The wireless node of claim 1, wherein the wireless multi-hop network comprises a direct communication link, using the second carrier, between fewer than each pair of wireless nodes of the cluster of wireless nodes.

8. The wireless node of claim 1, wherein the one or more processors are further configured to cause the wireless node to:
receive a plurality of preamble resource identifications, wherein a preamble resource identification of the plurality of preamble resource identifications is received from a corresponding wireless node of the cluster of wireless nodes; and
select the selected routing option based at least in part on the plurality of preamble resource identifications.

9. The wireless node of claim 8, wherein the preamble resource identification of the plurality of preamble resource identifications indicates at least one of:
a preamble identifier,
a set of frequency resources associated with the second carrier during a specified time period,
a set of spatial resources associated with the second carrier during the specified time period, or
a combination thereof.

10. The wireless node of claim 9, wherein the specified time period comprises a slot.

11. The wireless node of claim 8, wherein the corresponding wireless node of the cluster of wireless nodes is to broadcast the preamble resource identification to each other wireless node of the cluster of wireless nodes.

12. The wireless node of claim 1, wherein the one or more processors are further configured to cause the wireless node to:
receive a plurality of availability flags, wherein an availability flag of the plurality of availability flags is received from a corresponding wireless node of the cluster of wireless nodes, wherein the availability flag indicates whether the corresponding wireless node is available during a specified time period, and
wherein the selected routing option is based at least in part on the plurality of availability flags.

13. The wireless node of claim 12, wherein the corresponding wireless node of the cluster of wireless nodes is to broadcast the availability flag to each other wireless node of the cluster of wireless nodes.

14. The wireless node of claim 1, wherein the access request message comprises at least one of:
a source identifier corresponding to the source node,
a destination identifier corresponding to the wireless node,
a requested link occupancy duration indicating a requested time duration for transmitting the data communication, or
a combination thereof.

15. The wireless node of claim 1, wherein the source node is to broadcast the access request message to each other wireless node of the cluster of wireless nodes.

16. The wireless node of claim 1, wherein the access response message comprises at least one of:
a source identifier corresponding to the source node,
a destination identifier corresponding to the wireless node,
a granted link occupancy duration indicating a granted time duration for transmitting the data communication, or
a combination thereof.

17. The wireless node of claim 1, wherein the one or more processors, to cause the wireless node to transmit the access response message, are configured to cause the wireless node to:
broadcast the access response message to each other wireless node of the cluster of wireless nodes.

18. The wireless node of claim 1, wherein the access response message indicates a reserved channel corresponding to the second carrier for the data communication.

19. The wireless node of claim 1, wherein the set of quasi-static link parameters indicates, for one of the communication links, at least one of:
a signal to noise ratio associated with the one of the communication links,
a latency associated with the one of the communication links, or
a combination thereof.

20. The wireless node of claim 1, wherein the set of routing options is maintained in a look up table that is propagated between each of the wireless nodes of the cluster of wireless nodes.

21. The wireless node of claim 1, wherein the set of routing options is updated based at least in part on propagation of an updated look up table.

22. The wireless node of claim 1, wherein the one or more processors are further configured to cause the wireless node to:

select the selected routing option by disqualifying unavailable routing options of the set of routing options.

23. The wireless node of claim 1, wherein the selected routing option corresponds to a specified time period having a duration of a specified quantity of microseconds.

24. The wireless node of claim 1, wherein a wireless node of the cluster of wireless nodes comprises an access point node associated with a rack in a data center.

25. A wireless node for wireless communication in a wireless multi-hop network, comprising:
   a memory; and
   one or more processors coupled to the memory, the one or more processors configured to cause the wireless node to:
      transmit, to a destination node, an access request message using a first carrier, wherein the first carrier is to be used for routing decision traffic by each wireless node of a cluster of wireless nodes of the wireless multi-hop network, wherein the cluster includes the wireless node and the destination node, and wherein the wireless node is an integrated access and backhaul (IAB) node of an IAB network in the wireless multi-hop network; and
      receive, from the destination node, an access response message using the first carrier, wherein the access response message indicates a selected routing option, of a set of routing options, for the wireless node to use to transmit a data communication to the destination node using a second carrier,
      wherein the set of routing options is maintained using a control plane procedure, and wherein the set of routing options comprises a plurality of routing options that are ordered based at least in part on a set of quasi-static link parameters corresponding to communication links between pairs of wireless nodes of the cluster of wireless nodes, wherein the communication links are associated with the second carrier.

26. A method of wireless communication performed by a wireless node in a wireless multi-hop network, comprising:
   receiving, from a source node, an access request message using a first carrier, wherein the first carrier is to be used for routing decision traffic by each wireless node of a cluster of wireless nodes of the wireless multi-hop network, wherein the cluster includes the wireless node and the source node, and wherein the source node is an integrated access and backhaul (IAB) node of an IAB network in the wireless multi-hop network; and
   transmitting, to the source node, an access response message using the first carrier, wherein the access response message indicates a selected routing option, of a set of routing options, for the source node to use to transmit a data communication to the wireless node using a second carrier,
   wherein the set of routing options is maintained using a control plane procedure, and wherein the set of routing options comprises a plurality of routing options that are ordered based at least in part on a set of quasi-static link parameters corresponding to communication links between pairs of wireless nodes of the cluster of wireless nodes, wherein the communication links are associated with the second carrier.

27. A method of wireless communication performed by a wireless node in a wireless multi-hop network, comprising:
   transmitting, to a destination node, an access request message using a first carrier, wherein the first carrier is to be used for routing decision traffic by each wireless node of a cluster of wireless nodes of the wireless multi-hop network, wherein the cluster includes the wireless node and the destination node, and wherein the wireless node is an integrated access and backhaul (IAB) node of an IAB network in the wireless multi-hop network; and
   receiving, from the destination node, an access response message using the first carrier, wherein the access response message indicates a selected routing option, of a set of routing options, for the wireless node to use to transmit a data communication to the destination node using a second carrier,
   wherein the set of routing options is maintained using a control plane procedure, and wherein the set of routing options comprises a plurality of routing options that are ordered based at least in part on a set of quasi-static link parameters corresponding to communication links between pairs of wireless nodes of the cluster of wireless nodes, wherein the communication links are associated with the second carrier.

28. The wireless node of claim 25, wherein the set of quasi-static link parameters indicates, for one of the communication links, at least one of:
   a signal to noise ratio associated with the one of the communication links,
   a latency associated with the one of the communication links, or
   a combination thereof.

29. The method of claim 26, wherein the set of quasi-static link parameters indicates, for one of the communication links, at least one of:
   a signal to noise ratio associated with the one of the communication links,
   a latency associated with the one of the communication links, or
   a combination thereof.

30. The method of claim 27, wherein the set of quasi-static link parameters indicates, for one of the communication links, at least one of:
   a signal to noise ratio associated with the one of the communication links,
   a latency associated with the one of the communication links, or
   a combination thereof.

* * * * *